Jan. 8, 1957
R. E. BLUE
2,776,593
COMBINATION INTERFEROMETER-SCHLIEREN APPARATUS FOR DENSITY
DETERMINATION IN NON-HOMOGENEOUS TRANSPARENT FIELDS
Filed Dec. 29, 1953
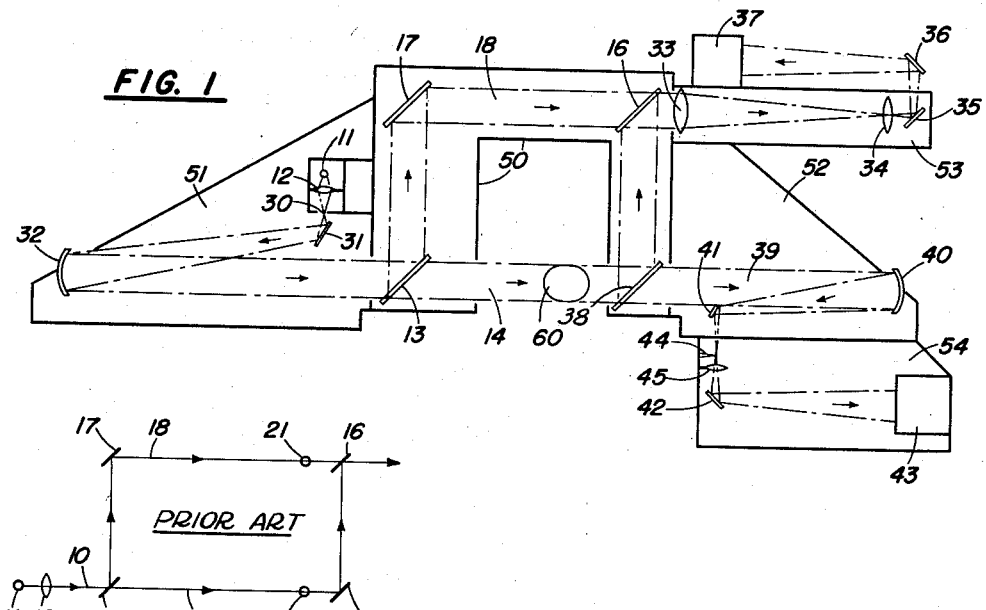
FIG. 1
FIG. 2
PRIOR ART
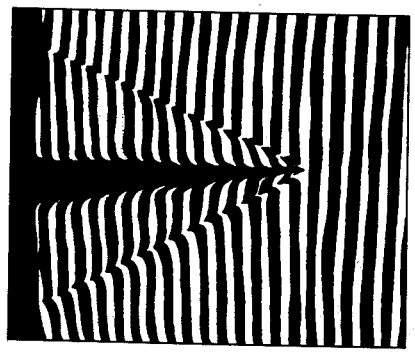
FIG. 3
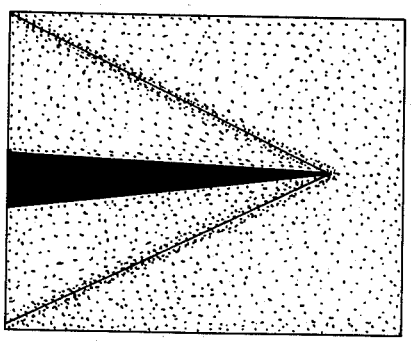
FIG. 4
INVENTOR.
ROBERT E. BLUE
BY Walter S. Paul
ATTORNEYS

United States Patent Office 2,776,593
Patented Jan. 8, 1957

2,776,593

COMBINATION INTERFEROMETER-SCHLIEREN APPARATUS FOR DENSITY DETERMINATION IN NON-HOMOGENEOUS TRANSPARENT FIELDS

Robert E. Blue, Lakewood, Ohio

Application December 29, 1953, Serial No. 401,098

3 Claims. (Cl. 88—14)

(Granted under Title 35, U. S. Code (1952), sec. 266)

The invention described herein may be manufactured and used by or for the Government of the United States of America for governmental purposes without the payment of any royalties thereon or therefor.

This invention relates to optical apparatus for density determinations in a non-homogeneous transparent medium, such as air.

Heretofore, two important optical methods have been used by aerodynamicists in examination of density variation in flow media, such as in the test chamber of a wind tunnel. One method employs the conventional ideas of the interferometer, which is directly responsive to the gas density in the test space, and because of the exact results available from this instrument, quantitative results are obtainable. The other method, known as the schlieren optical densitometer method, has the important advantage of permitting observations of the density gradients in the flow field.

The advantage of combining both methods is apparent, and an optical system was patented by Theodore Zobel, in Germany, which accomplished this result. In this instrument the conventional interferometer split beam system was used, one beam known as the reference beam and the other as the test beam, the latter penetrating the test space. Inserted in the test beam was a splitter plate passing a part of the test beam to a reflecting mirror for interferometer use and reflecting a part of the test beam to the schlieren optical branch. The disadvantage of this arrangement lies in the fact that the interference test beam passes through the splitter plate after it has traversed the field under investigation. This introduces an optical image aberration which complicates and, in many cases, invalidates quantitative evaluation of the interference pattern whenever there is an angular deviation of the light by refraction in the non-homogeneous field. In addition, to compensate for the splitter plate light absorption in the test beam a companion absorption plate must be placed in the reference beam.

It is accordingly an important object of the invention to provide a combined interferometer-schlieren optical system wherein the interferometer optical components are unaffected by the schlieren optical structure. An object also is to provide a combined optical system of the mentioned type wherein the necessity of absorption plate compensation in the reference beam is eliminated. Still another object is to simplify the structure and adjustments required in a combined interferometer-schlieren optical system.

Other objects and features of the invention will be apparent on consideration of the following detailed description of the invention and on reference to the accompanying drawings, in which:

Fig. 1 is a diagram of the optical system employed, with structural supports indicated;

Fig. 2 is a diagram of the conventional interferometer twin beam arrangement;

Fig. 3 is a copy of a photograph of the interference pattern resulting from supersonic air flow about a wedge shape using the described apparatus; and Fig. 4 is a copy of a photograph of the schlieren pattern of the wedge flow taken simultaneously with the interference photograph of Fig. 3.

In Fig. 2 is indicated a part of the conventional optical system of the interferometer most commonly used by the aerodynamicist for quantitative wind tunnel studies. A light beam 10 from a monochromatic source 11 is collimated by a lens 12 and allowed to fall on a part-silvered mirror or splitter plate 13. A part of the light passes through the plate 13 to form the test beam 14, the beam being reflected by mirror 15 and splitter plate 16 and proceeding to the image planes. Another part of the light at plate 13 is reflected to mirror 17 and re-reflected to splitter plate 16 to form the reference beam 18. Thence, it passes through this plate and continues to the image plane to form with beam 14 the interference fringe images. Numerals 20 and 21 indicate light absorption elements.

Reference is now made to Fig. 1. In this figure is illustrated the same optical elements as shown in Fig. 2, with such added elements as will make clear the revised structure of the interferometer-schlieren unit. The light source 11 passes light through the collecting lens 12 and plate aperture 30 to plane mirror 31 and spherical mirror 32 to form a parallel ray beam, the beam then being partly reflected and partly transmitted through splitter plate 13 to form test beam 14 and, after reflection from mirror 17, reference beam 18. Reference beam 18, after passage through splitter plate 16 continues through interferometer camera lenses 33 and 34 and is reflected by mirrors 35 and 36 to the interferometer camera image plane at 37.

Test beam 14, instead of being reflected by a mirror as 15 in Fig. 2, contacts a front silver surfaced splitter plate 38 where part of the beam is surface reflected to mirror 16 and part passed through the plate to form the schlieren beam 39, the beam being reflected from spherical mirror 40, plane mirror 41 and plane mirror 42 to the schlieren camera image plane at 43. The schlieren knife edge element 44 is placed at the focal point of the spherical reflector 40 and the schlieren camera lens 45 inserted between this element and mirror 42.

The various optical elements as above described are supported in appropriate relationship, as shown in Fig. 1, by an inverted U-shaped box frame 50 mounted on backing plate sections 51 and 52 with auxiliary plate support sections 53 and 54. The usual screw controls (not shown) are provided on plates 16 and 17 for adjustment of the interferometer light beams. In the apparatus used the collimating spherical mirror 32 is 6 inches in diameter and has a 36 inch focal length. Also the light division of splitter plate 13 is preferably in the ratio of 34, to 27 for reflected to transmitted light, the same light division being used on plate 38. All named mirrors are fully opaque.

In use, monochromatic light from source 11 is passed through the instrument with the test beam penetrating the test section of the gas flow field where aerodynamic phenomena is being investigated, as for example, supersonic air flow in a wind tunnel passing a wedge shape. It is apparent that the interferometer beam, after passing the test object 60, is not modified by plate transmission with consequent aberration complications but is reflected as in the conventional system from plates 38 and 16 to the interferometer camera.

The schlieren beam after passing through splitter plate 38 is focused at the schlieren knife edge and passed into the schlieren camera.

Figs. 3 and 4 show simultaneous photographs of the density phenomena, about an 8° wedge with supersonic flow at a Mach number of 3, Fig. 3 illustrating the interference pattern and Fig. 4 illustrating the density gradients in the flow field.

It is now apparent that by substitution of a splitter plate for mirror 15 (Fig. 2) and placement of a splitter plate at 16 for combining the reference and test beams, an interference beam is produced which is free of optical image aberration and absorption of compensating optical components. Further, the need of manipulation of the compensating plate is removed, thus simplifying the process of interferometer adjustment.

Modification in the structure and arrangement of the apparatus as described may of course be made and hence it is to be understood that within the scope of the appended claims the invention may be practiced otherwise than as described.

What is claimed is:

1. An optical system for quantitative and qualitative evaluation of density phenomena in air flow comprising a light source, means for collimating a light beam from said source, means for separating said beam into reference and test beams, means for combining said reference and test beams, an interferometer image plane, means for transmitting the combined beam to said interferometer image plane, a schlieren image plane, means for transmitting a schlieren beam to said schlieren image plane, and single means for reflecting a part of said test beam to said beam combining means and for transmitting a part of said test beam to said schlieren beam transmitting means.

2. An optical system for quantitative and qualitative evaluation of density phenomena of air flow comprising a light source, means for collimating a light beam from said source, means for separating said beam into reference and test beams, means for combining said reference and test beams, an interferometer image plane, means for transmitting the combined beam to said interferometer image plane, a schlieren image plane, means for transmitting a schlieren beam to said schlieren image plane, and means for dividing said test beam into interferometer and schlieren beams, said dividing means including a reflecting surface for direct reflection of said interferometer beam to said beam combining means.

3. An optical system for aerodynamic density evaluation, comprising a light source, means for collimating a light beam from said source, a splitter plate for dividing said beam into reference and test beams, a splitter plate for combining said reference and test beams, an interferometer, means for directing the combined reference and test beam to said interferometer, a schlieren densitometer, means for directing a schlieren beam to said schlieren densitometer plane, and a single splitter plate interposed in said test beam between said dividing and combining splitter plates for dividing said test beam into interferometer and schlieren beams, said single plate having a front reflector surface for reflecting the interferometer beam directly to said combining splitter plate, the schlieren beam being transmitted through said plate.

References Cited in the file of this patent

UNITED STATES PATENTS 2,151,631   Williams _____ Mar. 21, 1939

OTHER REFERENCES

Blue et al.: "An Interferometer-Schlieren Instrument for Aerodynamic Investigations," pages 754 and 755 in The Review of Scientific Instruments, vol. 23, No. 12, December 1952.